(12) United States Patent
Wang et al.

(10) Patent No.: US 12,105,224 B2
(45) Date of Patent: Oct. 1, 2024

(54) LiDAR ADAPTIVE SINGLE-PASS HISTOGRAMMING FOR LOW POWER LiDAR SYSTEM

(71) Applicant: Samsung Electronics Co., Ltd., Gyeonggi-do (KR)

(72) Inventors: Yibing Michelle Wang, Temple City, CA (US); Chunji Wang, Azusa, CA (US)

(73) Assignee: Samsung Electronics Co., Ltd (KR)

( * ) Notice: Subject to any disclaimer, the term of this patent is extended or adjusted under 35 U.S.C. 154(b) by 250 days.

(21) Appl. No.: 17/865,126

(22) Filed: Jul. 14, 2022

(65) Prior Publication Data

US 2023/0221419 A1  Jul. 13, 2023

Related U.S. Application Data

(60) Provisional application No. 63/298,622, filed on Jan. 11, 2022.

(51) Int. Cl.
  *G01S 7/4865* (2020.01)
  *G01S 17/10* (2020.01)

(52) U.S. Cl.
  CPC .......... *G01S 7/4865* (2013.01); *G01S 17/10* (2013.01)

(58) Field of Classification Search
  CPC ........ G01S 7/4865; G01S 17/10; G01S 7/487; G01S 7/4861; G01R 19/04; G04F 10/005
  See application file for complete search history.

(56) References Cited

U.S. PATENT DOCUMENTS 9,952,323 B2   4/2018   Deane
10,132,616 B2  11/2018  Wang
(Continued)

FOREIGN PATENT DOCUMENTS

CN   112099033   12/2020
CN   112100449   12/2020
(Continued)

OTHER PUBLICATIONS

Seo, Hyeongseok et al., "Direct TOF Scanning LiDAR Sensor With Two-Step Multievent Histogramming TDC and Embedded Interference Filter", IEEE Journal of Solid-State Circuits, vol. 56, No. 4, Apr. 2021, pp. 14.

*Primary Examiner* — Hina F Ayub
*Assistant Examiner* — Judy Dao Tran
(74) *Attorney, Agent, or Firm* — The Farrell Law Firm, P.C.

(57) ABSTRACT

Disclosed is a single pass light detection and ranging (LiDAR) laser method, including building a coarse histogram, detecting a first peak of laser pulses in the coarse histogram, determining whether the first peak height is greater than a first threshold and a location of the first peak is less than or equal to a second threshold, when determining that the first peak height is greater than the first threshold and the location of the first peak is less than or equal to the second threshold, building a fine histogram, and detecting a peak of laser pulses in the fine histogram, and when determining that the first peak height is less than or equal to the first threshold and the location of the first peak is greater than the second threshold, continuing the building of the coarse histogram, and detecting a second peak of the laser pulses in the coarse histogram.

20 Claims, 4 Drawing Sheets

(56) References Cited

U.S. PATENT DOCUMENTS

| | | | |
|---|---|---|---|
| 10,921,454 B2 | 2/2021 | Van Dyck et al. | |
| 2020/0025894 A1 | 1/2020 | Van Dyck et al. | |
| 2020/0116838 A1 | 4/2020 | Erdogan et al. | |
| 2020/0233068 A1 | 7/2020 | Henderson et al. | |
| 2020/0284883 A1 | 9/2020 | Ferreira et al. | |
| 2020/0284907 A1 | 9/2020 | Gupta et al. | |
| 2020/0341144 A1 | 10/2020 | Pacala et al. | |
| 2020/0386893 A1 | 12/2020 | Gupta et al. | |
| 2021/0181317 A1 | 6/2021 | Zhu et al. | |
| 2021/0302550 A1* | 9/2021 | Dutton | G01S 17/10 |
| 2023/0176223 A1* | 6/2023 | Pacala | G01S 7/4865 356/5.01 |

FOREIGN PATENT DOCUMENTS

| | | |
|---|---|---|
| WO | WO 2020/049203 | 3/2020 |
| WO | WO 2020/232016 | 11/2020 |
| WO | WO 2021/001261 | 1/2021 |
| WO | WO 2021/046547 | 3/2021 |
| WO | WO 2021/051480 | 3/2021 |
| WO | WO 2021/072380 | 4/2021 |

\* cited by examiner

LiDAR ADAPTIVE SINGLE-PASS HISTOGRAMMING FOR LOW POWER LiDAR SYSTEM

PRIORITY

This application is based on and claims priority under 35 U.S.C. § 119(e) to U.S. Provisional Application Ser. No. 63/298,622, which was filed in the U.S. Patent and Trademark Office on Jan. 11, 2022, the contents of which are incorporated herein by reference.

FIELD

The disclosure relates generally to imaging, and more particularly, to a high-resolution light detection and ranging (LiDAR) method and apparatus with a single-pass histogram building scheme.

BACKGROUND

In the prior art, a two-pass, two window LiDAR system has been implemented. In this system, half of laser pulses are used in the first pass, and the other half of the laser pulses are used in the second pass. This is initially performed in a course manner, and then is performed in a finer manner in order to achieve a finer resolution. However, this implementation has some drawbacks.

For example, the prior art implementation requires the use of excessive power. Specifically, only a lower resolution signal is obtained in the first half of the laser pulses, and the finer resolution signal is not obtained until the other half of the laser pulses from the second half is measured.

In particular, the two-pass, two window LiDAR system requires the histogram block to have a total of B bins. Each histogram block may build a histogram having a coarse bin size (low range resolution) with large (usually full) range coverage in the first pass to find the approximate range of the object in check. Then, the second pass uses a fine histogram bin (high resolution) with a narrowed range around the coarse measurement to achieve a higher accuracy measurement. For example, consider B=20. In the first pass, the coarse bin size may be two nanoseconds (2 ns), resulting in a detection range of six meters (6 m). A coarse peak may be detected around bin 10, which is 3 m. Then, the histogram block may be reset and a fine histogram may be built with a fine bin size of 0.25 ns around 3 m. With the same 20 bins, the covered range may be 0.75 m around 3 m.

Although a coarse peak may already be found with M laser pulses, the second passes may use approximately the same number of pulses to determine the fine peak, Therefore, a total 2M pulses may be used, resulting in about a 50% waste of optical power.

In the prior art, therefore, although both halves of the laser pulses are measured, only the finer resolution signal is used and the lower resolution signal from the first half of the laser pulse is discarded, which is an additional waste of power and resources.

As such, there is a need in the art for a method and apparatus that improves upon the two-pass, two window solution, thereby preventing the use of excessive power and waste of resources in the LiDAR system.

SUMMARY

The present disclosure has been made to address at least the above-mentioned problems and/or disadvantages and to provide at least the advantages described below.

Accordingly, an aspect of the present disclosure is to provide a low-power LiDAR method and apparatus which use the first half of the laser pulses that are discarded in the prior art measurement.

Another aspect of the present disclosure is to provide a low-power LiDAR method and apparatus with a single-pass histogram building, an ambient light estimation mode, a coarse histogram building mode, a fine histogram building mode, and an adaptive transition from coarse mode to fine mode.

Another aspect of the present disclosure is to provide a low-power LiDAR method and apparatus that achieves an increased range accuracy at long range beyond time-to-digital converter (TDC) resolution, as well as lower power consumption.

Another aspect of the present disclosure is to provide a low-power LiDAR method and apparatus that does not require but achieves resolution as if with a narrower laser pulse with higher peak power.

In accordance with an aspect of the disclosure, a single pass LiDAR laser method includes building a coarse histogram, detecting a first peak of laser pulses in the coarse histogram, determining whether the first peak is higher than (i.e., greater than) a first threshold and the location of the first peak is less than or equal to a second threshold, when determining that the first peak is greater than the first threshold and the location of the first peak is less than or equal to the second threshold, building a fine histogram, and detecting a peak in the fine histogram, and when determining that the first peak is less than or equal to the first threshold and the location of the first peak is greater than the second threshold, continuing the building of the coarse histogram, and detecting a second peak of the laser pulses in the coarse histogram.

In accordance with another aspect of the disclosure, an electronic device includes at least one processor, and at least one memory operatively connected with the at least one processor, the at least one memory storing instructions, which when executed, instruct the at least one processor to perform a single pass LiDAR laser method by building a coarse histogram, detecting a first peak in the coarse histogram, determining whether the first peak is greater than first threshold and a location of the first peak is less than or equal to a second threshold, when determining that the first peak is greater than the first threshold and the location of the first peak is less than or equal to the second threshold, building a fine histogram, and detecting a peak of laser pulses in the fine histogram, and when determining that the first peak is less than or equal to the first threshold or the location of the first peak is greater than the second threshold, continuing the building of the coarse histogram, and detecting a second peak of the laser pulses in the coarse histogram.

BRIEF DESCRIPTION OF THE DRAWINGS

The above and other aspects, features, and advantages of certain embodiment of the present disclosure will be more apparent from the following detailed description taken in conjunction with the accompanying drawings, in which.

DETAILED DESCRIPTION

Figure 1:
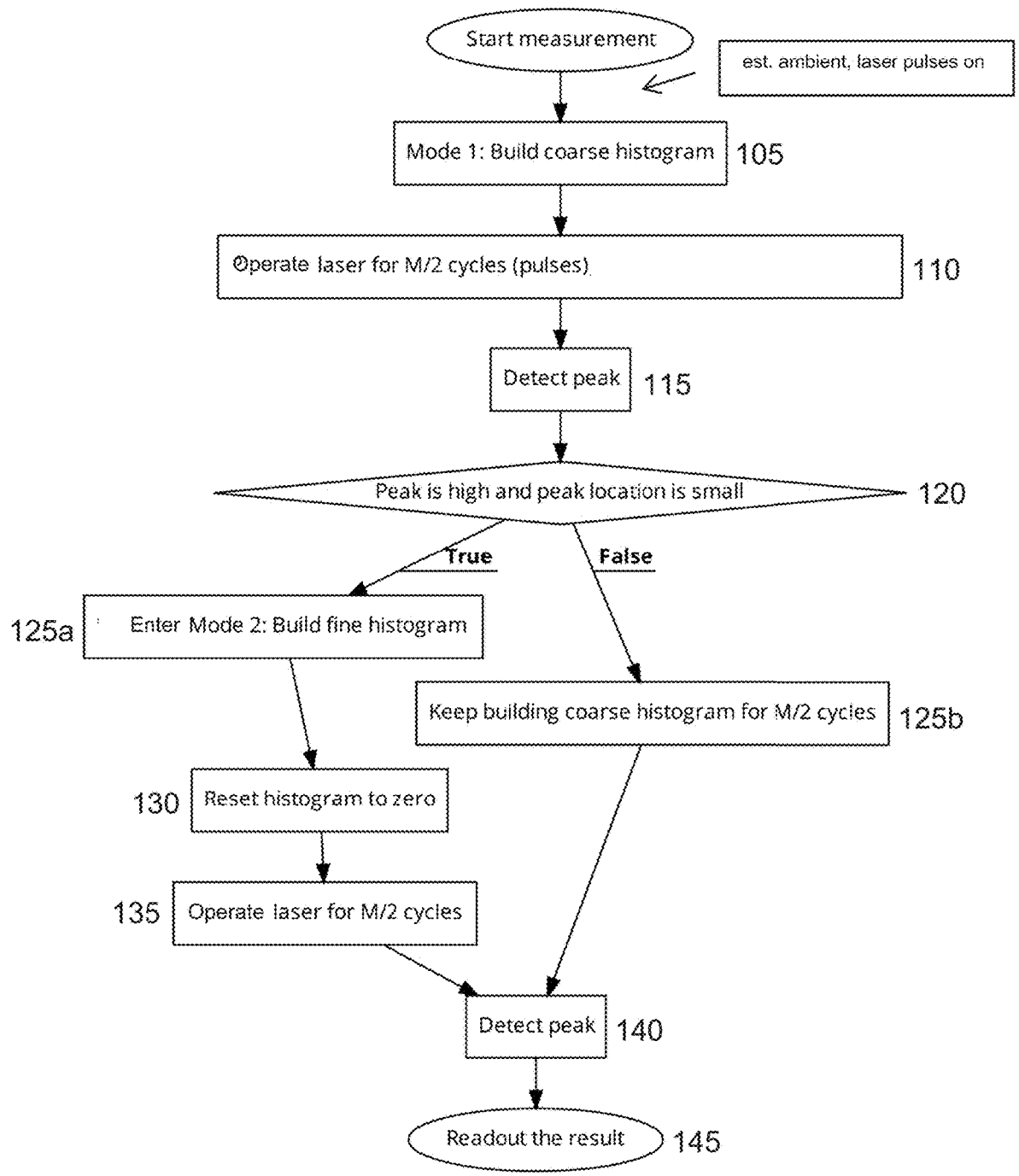
FIG. 1 is a flow chart illustrating a single pass LiDAR method according to an embodiment.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

Disclosed herein is a single pass LiDAR method and apparatus, in which the lower resolution signal of the first half of the laser pulses is preserved, not discarded as in the prior art. Therefore, all of the measured signals are utilized in the single pass LiDAR method and apparatus disclosed herein.

The present disclosure may be used in mobile three-dimensional (3D), alternative reality (AR)/virtual reality (VR)/mixed reality (MR)/extended reality (XR), automotive front facing camera, and/or advanced driver-assistance systems (ADAS), but is not limited to these implementations.

Disclosed herein is a direct time-of-flight (DTOF)-based LiDAR system, which measures distance of an object by sending multiple short laser pulses to the object and measures the TOF of the returned pulses. Single-photon avalanche diode (SPAD) pixels in the DTOF sensor may capture impinging photons and generate digital codes using TDCs to represent the photon's TOF information. The captured photons are received from ambient light or active laser illumination. A histogram may be constructed with the digital codes captured over hundreds or thousands of repetitions. The resolution of the DTOF-based LiDAR, is determined by the frequency of the TDC clock and thus the TDC resolution.

The present disclosure teaches a manner in which a large amount of data may be generated by SPAD pixels. A large memory size or counter depth may be used to build full on-chip histograms herein.

FIG. 1 is a flow chart illustrating a single pass LiDAR method according to an embodiment.

In step 105, after the ambient light is estimated and the laser pulses are turned on, an ambient estimation mode is initiated without laser pulses and the coarse histogram (mode 1) is built using laser pulses. After a specified number of laser pulses, the height and location of the histogram peak may be determined and may be used to determine whether to switch to the fine histogram building mode. In so doing, the resolution may be increased at close range, while not sacrificing half of the data at long range as in the manner of the above-described two-pass histogram building method.

Building the histogram may be initiated with a slow TDC clock having a period that is 1/N a laser pulse width. Typical values of N may be 1 or 2. This is a coarse histogram in step 105 and may cover the kill detection range.

In step 110, the laser is used for M/2 cycles and the peak and peak location of the coarse histogram may be determined by applying a digital filter to the histogram. For example, a box filter may be applied for calculating a running sum of the laser returns, and the peak location in the coarse histogram may be detected in step 115 after filtering. The filtering can be applied on-the-fly or after a predetermined number of laser cycles is completed.

In step 120, it is determined whether a dominant (high) peak in a narrow location (range) is found. For example, if a dominant peak is found within a predefined short/mid-range, such as a small bin index of 15 or less, during the first half (or M/2) number of cycles, the entire histogram may be reset to build a fine histogram in step 125a with the range centered around the coarse peak location. In this manner, the method enters mode 2. In other words, finding a dominant/high peak reveals that the target is close, as will be described in more detail in reference to FIG. 3. If no dominant peak is found in the short/mid-range, the coarse histogram continues to be built in step 130 with the rest of the M/2 laser cycles, i.e., one half of the total number of laser pulses.

Herein, a small bin index or small peak location may be considered as between about 30%-60% of the entire range coverage.

In step 130, a histogram reset occurs during the middle of the measurement for the short and mid-range Objects. Thus, no reset occurs for long range objects when the method is not switched to mode 2.

In step 135, after the histogram is reset in step 130, the laser is used for M/2 pulses (or cycles), i.e., one half of a width of the laser pulse, and a faster TDC clock and a reduced TDC window may be used for short and mid-range objects in the fine histogram. Short range and mid-range data processing may be based on the fine histogram with only the data points Obtained after the histogram reset, which is less than M pulses.

In step 140, a fine histogram peak detection is performed by cross-correlation with a laser waveform.

Returning to step 120, if no dominant peak is found within a predefined short/mid-range, building of the coarse histogram for M/2 cycles in mode 1 continues in step 125*b*; and a coarse histogram peak detection is performed in step 140.

In step 145, the result of the peak detection is read.

The conventional two-pass method only utilizes half of the data (M/2 pulses) in the histogram. Herein, however, long range data processing may be based on the coarse histogram with full data points from M laser pulses. That is, for long range target, the LiDAR method and apparatus herein remains in coarse histogram mode, such that the histogram cumulates and uses data from M laser pulses. Accuracy beyond TDC resolution may be achieved using the combined peak detection of the coarse histogram and some peak enhancement algorithms, such as a laser waveform (pulse) fitting method. In addition, fewer pulses are needed for the short-range target data processing without sacrificing reliability.

Figure 2:
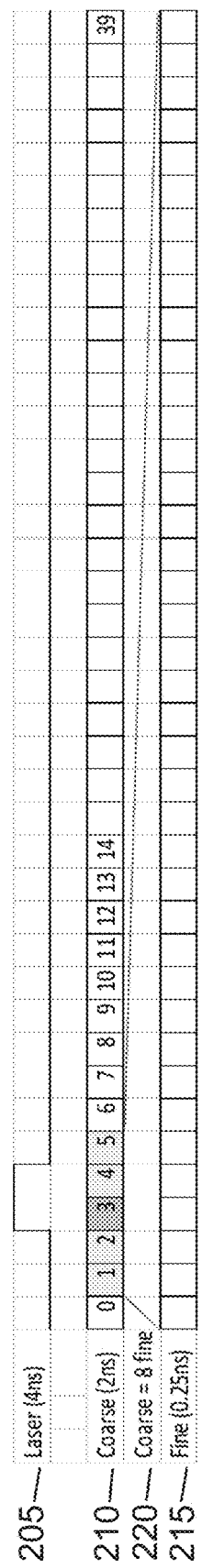
FIG. 2 illustrates single-pass adaptive histogramming, according to an embodiment.

FIG. 2 illustrates single-pass adaptive histogramming 200, according to an embodiment.

In FIG. 2, a total number of laser cycles M may be determined to be used for the maximum detection range. Using a 4 ns laser (205), a coarse histogram may be built for the entire detection range with large histogram bin size w_c, such as 2 ns (210). A coarse bin size w_c may be a fraction of a laser pulse width w_p, where w_p/w_c is an integer. The pulse width is multiples of the TDC period.

The fine histogram bin size w_f can be a fraction of the coarse histogram bin size, where w_c/w_f is an integer, such as w_c/w_f=4, 8, 16 . . . . In FIG. 2, the fine histogram bin size is 0.25 ns (215), where 8 times (220) the fine histogram bin size makes up the coarse bin size 2 ns (210), which is a fraction 1/N of the laser pulse.

Herein, the highest peak height may be assumed to be a, and its highest neighbor bin height may be b. The peak location may then shift by w_c*b/(a+b). In this manner, sub bin size resolution may be achieved. In some embodiments, this may assume the laser pulse width w_p is equal to coarse bin size w_c.

As described above in FIG. 1, a peak detection is performed after M/2 (or half) of the cycles is detected. It is determined that the object is very dose when the detected peak is high. As a result, a switch is made to the fine histogram building mode (mode 2). If there is no high detected peak, it is determined that the object is not very close. Thus, detection remains in the coarse mode (mode 1).

For a long-range target, the system may remain in coarse histogram mode, such that the histogram ultimately cumulates data from M laser pulses. For a short-range target, fewer pulses are needed to achieve the same reliability as in a two-pass method. That is, the determination of whether a target is a long-range or short-range target depends on ambient toleration and laser power. In design, the laser power is balanced with the ambient toleration, such that more laser power is needed as the ambient light increases. The switch point is a trade-off between ambient light and laser power. Herein, the design for mobile application contemplates above about 6M for a long-range target, about a 4M-6M range for a mid-range target, and about a 0M-4M range for a short-range target. In addition, a strong laser return from the target is considered to be short-range, a significant laser return is considered to be mid-range, and the laser return being slightly stronger than the ambient light is considered to be long-range.

It is further noted that high peak and low peak detection depends on system design. Herein, high peak is considered as at least about ten times higher than the ambient background, although another system design may consider a peak of at least about five times higher than the ambient background to be a high peak.

Figure 3:
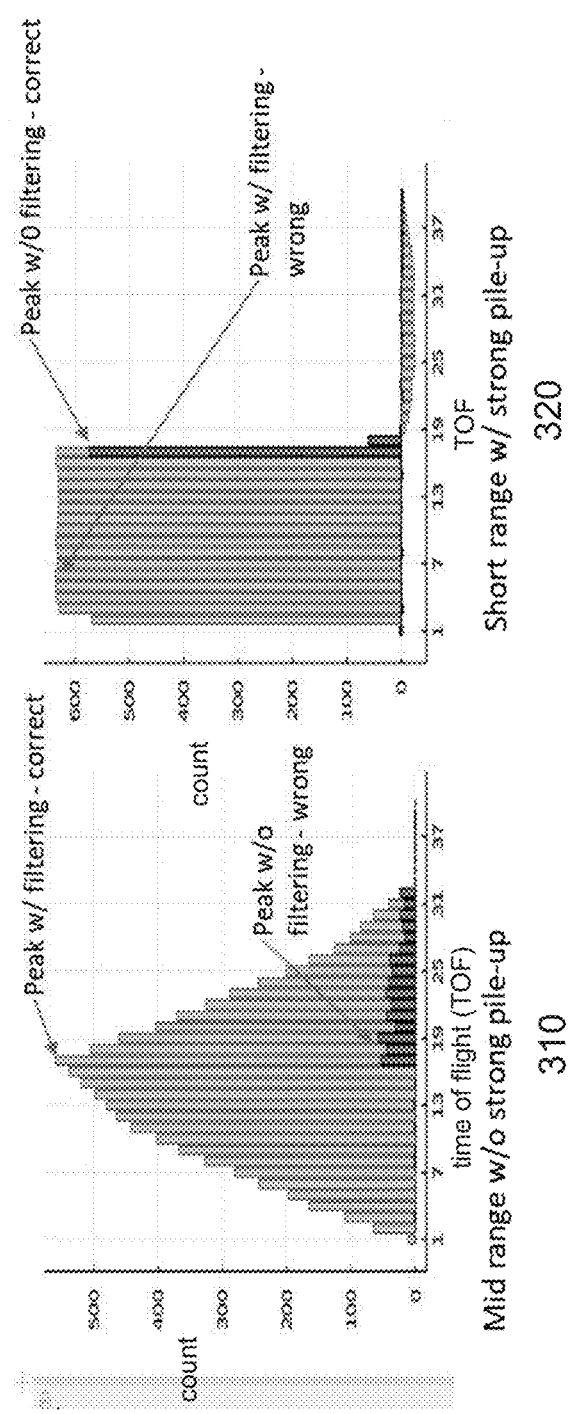
FIG. 3 illustrates peak detection for short and mid-range objects, according to an embodiment.

FIG. 3 illustrates peak detection 300 for short and mid-range objects, according to an embodiment. That is, FIG. 3 reflect the switch to mode 2 from steps 135 to 140 in FIG. 1.

In graph 320 in FIG. 3, a pile-up may occur for short range returns, which indicates that the laser is strong at the beginning and the response is not uniform over the laser pulse range. The peak is therefore determined without any filtering.

In graph 310, for mid-range returns without a dense pile-up, indicating that the response is uniform over the laser pulse range, a digital filter may be applied to the resulting histogram and then the peak may be found. The filter can be a box filter with its width equal to the laser pulse width. The result of box filtering may be a running sum of the laser returns. The filter may have a shape similar to (i.e., aligned with) the laser pulse. The end result may be a cross-correlation between the received signal and the projected laser signal.

For waveform fitting and to improve resolution beyond TDC resolution, a two-pass method may use a laser pulse with short and high power, as well as additional cycles (pulses) to ensure reliability.

However, embodiments of the present disclosure provide waveform fitting to improve resolution beyond bin size. Embodiments herein may relax requirements on laser sharpness and may use half of the number of pulses without sacrificing reliability, as described above in reference to FIG. 1.

Embodiments of the present disclosure provide a DTOF sensor with a single-pass adaptive histogramming, data processing methods for different ranges. The peak of fine histogram may be found in the short-range. The peak of the fine histogram may be found in the mid-range after applying filtering. In the long range, the laser waveform may be fit to the histogram to improve the resolution beyond coarse bin sizes.

The present disclosure may be compatible with scanning and flash LiDAR, may use a digital histogram, may adaptively switch to the fine bin mode (mode 2), and may provide an ambient estimation, i.e., an estimation of ambient light that is present.

Figure 4:
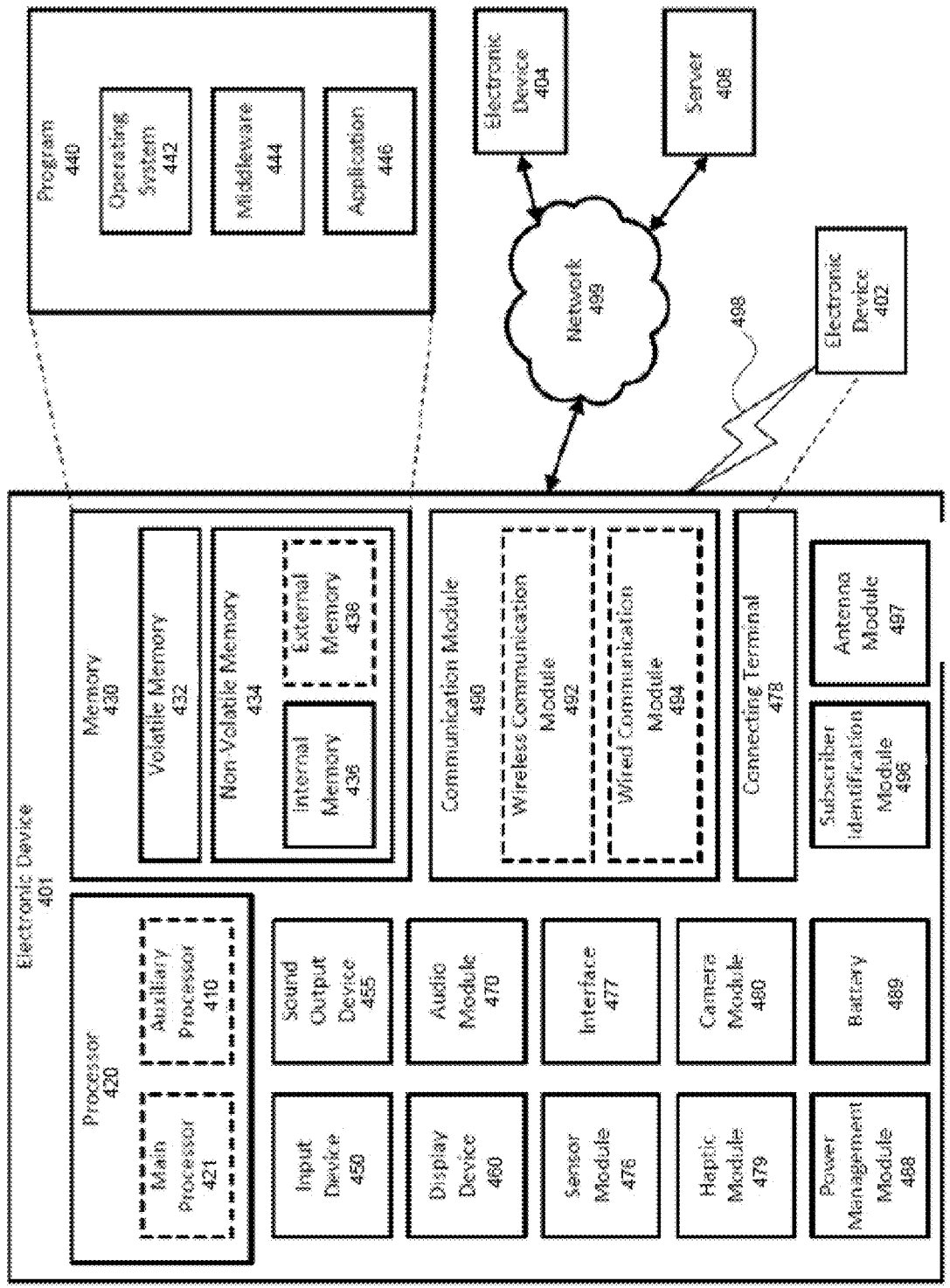
FIG. 4 is a block diagram of an electronic device in a network environment, according to an embodiment.

FIG. 4 is a block diagram of an electronic device in a network environment 400, according to an embodiment. Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network), The electronic device 401 may communicate with the electronic device 404 via the server 408. The electronic device 401 may include a processor 420, a memory 430, an input device 440, a sound output device 455, a display device 460, an audio module 470, a sensor module 476, an interface 477, a haptic module 479, a camera module 480, a power management module 488, a battery 489, a communication module 490, a subscriber identification module (SIM) card 496, or an antenna module 494. In one embodiment, at least one (e.g., the display device 460 or the camera module 480) of the components may be omitted from the electronic device 401, or one or more other components may be added to the electronic device 401. Some of the components may be implemented as a single integrated circuit (IC), For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420 and may perform various data processing or computations. As at least part of the data processing or computations, the processor 420 may load a command or data received from another component (e.g., the sensor module 446 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by another component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. The receiver may be implemented as being separate from, or a part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450 or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. The interface 477 may include, for example, a high-definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include, for example, an HDMI connector, a USB connector, an SD card connector, or an audio connector e.g., a headphone connector).

The haptic module 479 may convert an electrical signal into a mechanical stimulus (e.g., a vibration or a movement) or an electrical stimulus which may be recognized by a user via tactile sensation or kinesthetic sensation. The haptic module 479 may include, for example, a motor, a piezoelectric element, or an electrical stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. The antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

Commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A single pass light detection and ranging (LiDAR) laser method, comprising:
    building a coarse histogram;
    detecting a first peak of laser pulses in the coarse histogram;
    determining whether the first peak height is greater than a first threshold and a location of the first peak is less than or equal to a second threshold;
    when determining that the first peak height is greater than the first threshold and the location of the first peak is less than or equal to the second threshold:
    building a fine histogram; and
    detecting a peak of laser pulses in the fine histogram, and
    when determining that the first peak height is less than or equal to the first threshold and the location of the first peak is greater than the second threshold:
    continuing building the coarse histogram; and
    detecting a second peak of the laser pulses in the coarse histogram.

2. The method of claim 1,
    wherein the first and second peaks and the peak location of the coarse histogram are determined by applying a digital filter to the coarse histogram.

3. The method of claim 2,
    wherein an amount of the laser pulses in the coarse histogram is one half of a total number of the laser pulses in the coarse histogram, and
    wherein an amount of the laser pulses in the fine histogram is one half of a total number of the laser pulses in the fine histogram.

4. The method of claim 3,
    wherein building the coarse histogram is associated with a time-to-digital converter clock having a period that is 1/N of the laser pulse width, where N is 1 or 2.

5. The method of claim 1,
    wherein the first threshold indicates that a target object is zero to six meters from the LiDAR laser.

6. The method of claim 5,
    wherein the second threshold is a bin index of 15.

7. The method of claim 1, further comprising:
    re-setting the fine histogram to zero before building the fine histogram and before detecting the peak of the laser pulses in the fine histogram.

8. The method of claim 7,
    wherein the coarse histogram is built in a first mode, and
    wherein the fine histogram is built in a second mode.

9. The method of claim 8,
    wherein the peak of the laser pulses in the fine histogram is detected by cross-correlation with a laser waveform.

10. The method of claim 1,
    wherein the method is performed by using a direct time-of-flight (DTOF)-based LiDAR sensor.

11. An electronic device, comprising:
    at least one processor; and
    at least one memory operatively connected with the at least one processor, the at least one memory storing instructions, which when executed, instruct the at least one processor to perform a single pass light detection and ranging (LiDAR) laser method by:
    building a coarse histogram;
    detecting a first peak of laser pulses in the coarse histogram;
    determining whether the first peak is greater than a first threshold and a location of the first peak is less than or equal to a second threshold;

when determining that the first peak is greater than the first threshold and the location of the first peak is less than or equal to the second threshold:
building a fine histogram; and
detecting a peak of laser pulses in the fine histogram, and
when determining that the first peak is less than or equal to the first threshold and the location of the first peak is greater than the second threshold:
continuing the building of the coarse histogram; and
detecting a second peak of the laser pulses in the coarse histogram.

12. The electronic device of claim 11,
wherein the first and second peaks and the peak location of the coarse histogram are determined by applying a digital filter to the coarse histogram.

13. The electronic device of claim 12,
wherein an amount of the laser pulses in the coarse histogram is one half of a total number of the laser pulses in the coarse histogram, and
wherein an amount of the laser pulses in the fine histogram is one half of a total number of the laser pulses in the fine histogram.

14. The electronic device of claim 13, further comprising:
a time-to-digital converter clock,
wherein building the coarse histogram is associated with the time-to-digital converter clock having a period that is 1/N of the laser pulse width, where N is 1 or 2.

15. The electronic device of claim 11,
wherein the first threshold indicates that a target object is zero to six meters from the LiDAR laser.

16. The electronic device of claim 15,
wherein the second threshold is a bin index of 15.

17. The electronic device of claim 11,
wherein the fine histogram is re-set to zero after the fine histogram is built and before the peak of the laser pulses in the fine histogram is detected.

18. The electronic device of claim 17,
wherein the coarse histogram is built in a first mode, and
wherein the fine histogram is built in a second mode.

19. The electronic device of claim 18,
wherein the peak of the laser pulses in the fine histogram is detected by cross-correlation a laser waveform.

20. The electronic device of claim 11, further comprising:
a direct time of flight (DTOF) sensor,
wherein the single pass LiDAR method is performed by using the DTOF sensor.

* * * * *